United States Patent [19]
Shinokura et al.

[11] Patent Number: 5,199,097
[45] Date of Patent: Mar. 30, 1993

[54] LIGHT WAVELENGTH SHIFTER

[75] Inventors: Kichiro Shinokura; Tetsuro Endo, both of Tendo, Japan

[73] Assignee: Pioneer Electronic Corporation, Tokyo, Japan

[21] Appl. No.: 765,734

[22] Filed: Sep. 26, 1991

[30] Foreign Application Priority Data

Oct. 18, 1990 [JP] Japan ................... 2-279957

[51] Int. Cl.5 .................. G02B 6/00; G02F 1/37
[52] U.S. Cl. .................. 385/122; 385/123; 359/332
[58] Field of Search ............ 359/326–332; 385/122, 123

[56] References Cited

U.S. PATENT DOCUMENTS

| | | | |
|---|---|---|---|
| 3,621,273 | 11/1971 | Rorden et al. | 359/328 |
| 3,858,056 | 12/1974 | Melamed et al. | 359/328 X |
| 4,907,850 | 3/1990 | Araki et al. | 350/96.13 |
| 4,952,013 | 8/1990 | Harada et al. | 385/123 X |
| 4,968,121 | 11/1990 | Bruesselbach et al. | 359/328 |
| 4,971,416 | 11/1990 | Khanarian et al. | 359/328 |
| 5,029,976 | 7/1991 | Goto | 359/326 X |
| 5,038,352 | 8/1991 | Lenth et al. | 359/326 X |
| 5,077,748 | 12/1991 | Kozlovsky et al. | 359/328 X |
| 5,093,832 | 3/1992 | Bethune et al. | 359/328 X |

OTHER PUBLICATIONS

N. Uesugi et al., "Efficient Second-harmonic Generation in Three-dimensional $LiNbO_3$ Optical Waveguide", Applied Physics Letters, vol. 29, Nov. 1, 1976, pp. 572–574.

K. Jain, "Use of Potassium Niobate . . . ", IBM Technical Disclosure Bulletin, vol. 24, No. 3, Aug. 1981, p. 1472.

J. C. Baumert et al., "High Efficiency . . . ", Optics Communications, vol. 48, No. 3, Dec. 1983, pp. 215–220.

Y. Uematsu, "Nonlinear Optical . . . ", Japanese Journal of Applied Physics, vol. 13, No. 9, Sep. 1974, pp. 1362–1368.

Primary Examiner—John D. Lee
Assistant Examiner—Stephen W. Barns
Attorney, Agent, or Firm—Sughrue, Mion, Zinn, Macpeak & Seas

[57] ABSTRACT

An optical waveguide type light wavelength shifter device has a core made of a nonlinear optical crystal and a cladding. The optical waveguide type light wavelength shifter device is provided with a thermoelectric element so that wavelength variation of the second harmonic wave resulting from a variation in the wavelength of an incident light can be minimized.

2 Claims, 2 Drawing Sheets

LIGHT WAVELENGTH SHIFTER

BACKGROUND OF THE INVENTION

1. Field of the Invention

The present invention relates to a light wavelength shifter device and, more particularly, to an optical waveguide type light wavelength shifter device of a so-called guided mode matching type.

2. Description of Background Information

Second harmonic generator (abbreviated to SHG) is widely used as a light wavelength shifter device, which has an optical waveguide composed of a nonlinear optical crystal so that a light wave is propagated into a minute region for the generation of second harmonics with high efficiency. As this type of light wavelength shifter devices, two different types are known according to methods of phase matching: one employs a guided mode matching method in which a nonlinear polarized wave derived from a primary incident light is equalized in phase velocity with a second harmonic wave so that phase matching is made between a fundamental wave, i.e., a guided mode wave of the primary incident light and guided mode wave of the second harmonic wave; and the other is a type using a Cerenkov radiation method in which phase matching is made between a guided mode wave of the fundamental wave and a radiation mode wave of the second harmonic wave.

FIG. 1 illustrates, for example, an SHG of a ridge waveguide type, which comprises a core 1 made of lithium niobate (LiNbO$_3$), a nonlinear optical crystal, and a cladding 2 of lithium tantalate (LiTaO$_3$), an optical crystal material. In operation, a fundamental wave of a primary light is incident on one end of a ridge 3 or rib projection of the core 1. Then, a resultant second harmonic wave and a remaining fundamental wave component emerge from the other end of the ridge 3.

FIG. 2 is a cross-sectional view of the ridge type SHG. The core 1 of lithium niobate having a refractive index $n_1$ is mounted on the cladding 2 of lithium tantalate which has a refractive index $n_2$. In the guided mode matching, the matching wavelength $\lambda m$ of the primary incident light for shifting the primary incident light to a second harmonic wave having a wavelength of a half the primary incident light is expressed as a function of the overall height H of the core 1 and the refractive indices $n_1$ and $n_2$ of the core 1 and cladding 2.

More specifically, the matching wavelength $\lambda m$ of the primary light is determined by parameters $n_1$, $n_2$, d, H, and h as shown in FIG. 2. As the dimensions d, H, and h of each device are determined during the production, the matching wavelength $\lambda m$ will be determined uniquely if the two refractive indices $n_1$ and $n_2$ are constant.

As a light source of the fundamental wave, it is practical to use a semiconductor laser diode. However, the output wavelength of the semiconductor laser is usually not constant and, for instance, has a variation about 10 nm (nanometers). The wavelength is also affected by the factors of current and temperature. Hence, in the case of an SHG in which the matching wavelength $\lambda m$ of the primary light is uniquely determined, it will be difficult to attain phase matching, and the resultant second harmonic wave will become unstable.

OBJECT AND SUMMARY OF THE INVENTION

It is an object of the present invention to provide a light wavelength shifter device using an optical waveguide type SHG for waveguide mode matching for performing light wavelength shifting with high efficiency.

A light wavelength shifter device according to the present invention comprises: an optical waveguide type light wavelength shifter element comprising a core of a nonlinear light-sensitive crystal having a refractive index variation rate relative to temperature higher than $1 \times 10^{-4}/°$ C. and a cladding coupled directly to the core so that a primary incident light on the core can be shifted to second harmonics having a wavelength of a half the primary light; and a thermoelectric element coupled directly to said optical waveguide type light wavelength shifter element.

In operation, the matching wavelength of the optical waveguide type light wavelength shifter element is controlled in response to a variation in the wavelength of an incident light so that the resultant second harmonic wave becomes stable.

DETAILED DESCRIPTION OF PREFERRED EMBODIMENTS

A preferred embodiment of the present invention will be described referring to the accompanying drawings.

Figure 3:
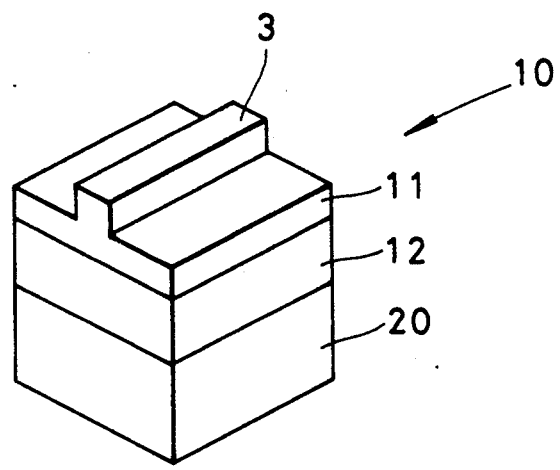
FIG. 3 is a perspective view of a ridge type light wavelength shifter device according to the present invention.

FIG. 3 shows a ridge type optical waveguide SHG as the embodiment of the present invention, which comprises an optical waveguide type light wavelength shifter element 10 and a thermoelectric element 20 coupled to the wavelength shifter element 10.

Figure 1:
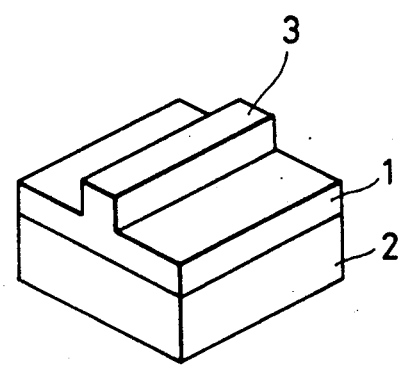
FIG. 1 is a perspective view of a known ridge type light wavelength shifter device.
Figure 2:
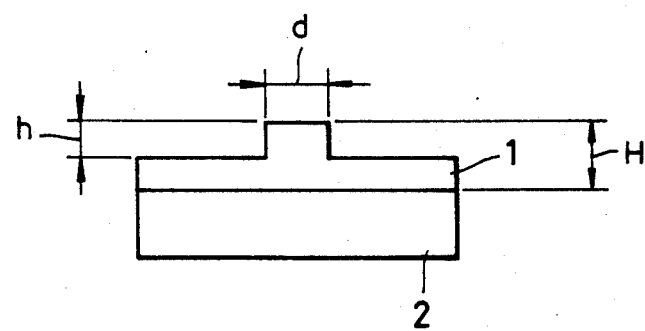
FIG. 2 is a cross-sectional view of the device shown in FIG. 1.

The optical waveguide type wavelength shifter element 10 comprises a core 11 made of a nonlinear optical crystal, namely, potassium niobate (KNbO$_3$), and a cladding 12 in contact with the core 11. Thus, the wavelength shifting element 10 has a configuration similar to that of the element shown in FIG. 1. In operation, the optical waveguide type wavelength shifter element 10 converts a primary incident light entering into one end of the core 11 to a second harmonic wave having a half wavelength, and radiates it from the other end of the core 11. This action is identical to that shown in FIG. 1. It is known that the potassium niobate has a property such that the refractive index varies considerably with temperature.

The thermoelectric element 20 is arranged to be in direct contact with the optical waveguide type wavelength shifter element 10, and is preferably made of a Peltier device of which heating and cooling can precisely be regulated by controlling the direction and magnitude of a current supplied thereto. More particularly, the Peltier device produces the Peltier effect, that is, an effect in which when a current flows across the junction between two different conductor or semiconductor substances, generation or absorption of heat other than Joule heat i takes place.

Since the potassium niobate exhibits a variation of refractive index highly dependent on temperature, the matching wavelength λm of the primary incident light can be shifted desirably by employing the Peltier device for controlling the temperature of the optical waveguide type light wavelength shifting element 10. For example, if the light output of a semiconductor laser diode used in an optical recording apparatus is to be shifted to a desired wavelength by the light wavelength shifter device of the present invention, variation in the output level of a second harmonic wave which depends on the variation in wavelength of the light output from the semiconductor laser is minimized. More specifically, although the wavelength of the second harmonic varies with the wavelength of the output light of the semiconductor laser, the variation of wavelength is within a range of several nanometers and a resultant change in the diameter of a light spot developed by the second harmonic light will be less than 1%. Thus there arises practically no problems.

The core 11 may be formed of a material other than the potassium niobate, and any nonlinear optical material the refractive index of which exhibits a high dependency on temperature may be used. The material of cladding 12 is not limited to lithium tantalate; any material whose refractive index is about $10^{-2}$ lower than that of the nonlinear optical crystal of the core 11 may be used.

As described above, it is preferable that the core 11 is made of a material which exhibits a high dependency of refractive index on temperature. The reason will now be explained more specifically. A condition for the phase matching in the wavelength shifting with an SHG is that the refractive index $N_{107}$ of the nonlinear optical crystal waveguide (referred to as a waveguide hereinafter) against the primary incident light is equal to the refractive index $N_{2\omega}$ of the waveguide to a second harmonic wave generated by wavelength shifting function ($N_{107}==N_{2\omega}$), where N is an equivalent refractive index of the waveguide, and $2\omega$ is the frequency of the second harmonic wave. Hence, if a proportion of the amount of variation $d(N_{107} - N_{2\omega})$ of the difference in equivalent refractive index, with respect to a variation in wavelength $d\lambda$ and to a change in temperature dT, respectively, is taken into consideration, the amount of variation $\Delta N_\lambda$ in the equivalent refractive index relative to the wavelength variation of the primary incident light is expressed by $\Delta N_{80}=d(N_{107}-N_{2\omega})/d\omega$. Also, the amount of variation $\Delta N_T$ in the equivalent refractive index relative to the temperature change is expressed by $\Delta N_T=d(N_\omega-N_{2\omega})/dT$. Accordingly, by correcting $\Delta N_\lambda$ with $\Delta N_T$, or more specifically by controlling the temperature of the cladding 12 so that the equivalent refractive index of the waveguide against the primary light becomes equal to the equivalent refractive index against the secondary light, the variation in the wavelength of the second harmonic wave will be minimized.

With respect to the above-described $\Delta N_\lambda$ and $\Delta N_T$, values for the lithium niobate (LN) of the cladding and values for the potassium niobate (KN) of the core, are as shown in Table 1.

TABLE 1

|  | LN | KN |
|---|---|---|
| $\Delta N_\lambda$ (1/nm) | about $4 \times 10^{-4}$ | about $2 \times 10^{-4}$ |
| $\Delta N_T$ (1/°C.) | about $0.4 \times 10^{-4}$ | about $1 \times 10^{-4}$ |

As is apparent from the table, for a variation of about 10 nm (nanometers) in wavelength of a primary light, the potassium niobate KN can produce phase matching with less of a temperature change ($\pm 10°$ C.) than (about $\pm 50°$ C.) can lithium niobate LN for carrying out the wavelength shifting.

Figure 4:
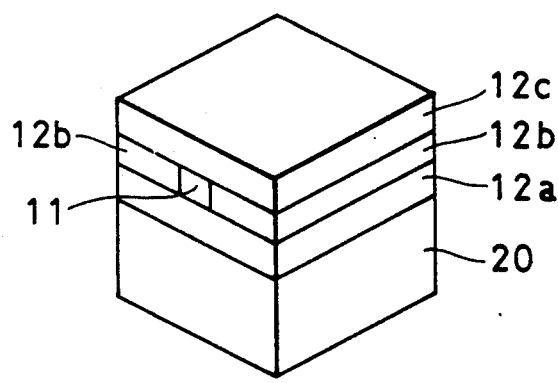
FIGS. 4 and 5 are perspective views of ridge type light wavelength shifter devices showing other embodiments of the present invention.
Figure 5:
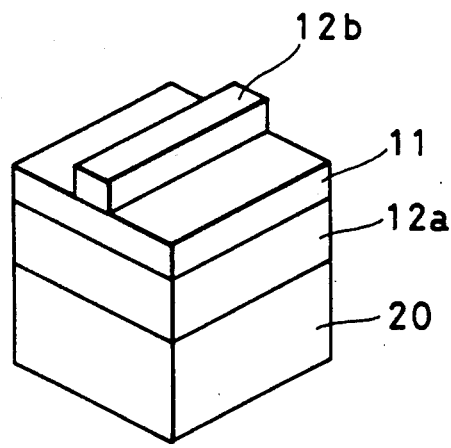

Although in the embodiment described above, explanation has been made by way of an example of a ridge type light wavelength shifter device, the light wavelength shifting device according to the present invention can be realized in the form of channel-type shifter devices such as shown in FIGS. 4 and 5. FIG. 4 illustrates a channel-type light wavelength shifting element in which the core 11 is d in the width, h in the height, and $n_1$ in the refractive index while the claddings 12a, 12b, and 12c are $n_{2a}$, $n_{2b}$, and $n_{2c}$ in the refractive index respectively. The matching wavelength λm of a primary light is determined by those parameters and the same effect as the first embodiment can be obtained by controlling the temperature with a thermoelectric element 20 coupled in an appropriate manner. FIG. 5 shows another channel type light wavelength shifter element in which the core 11 is d in the width, h in the height, and $n_1$ in the refractive index while the claddings 12a and 12b are $n_{2a}$ and $n_{2b}$ in the refractive index respectively. Also in this case, the same effect as the first embodiment can be obtained.

As described above, the light wavelength shifter device of the present invention comprises an optical waveguide type light wavelength shifter element formed of a nonlinear light-sensitive crystal and a thermoelectric element so that second harmonics generated from an incident light, e.g. a laser beam of a semiconductor laser diode, can be less varied in the wavelength regardless of wavelength variation of the incident light and satisfactorily used as source beams of light in an optical recording apparatus which are needed for high convergency and output stability. Variations in the wavelength of an output light of an economical semiconductor laser diode will thus be compensated by the optimum use of the light wavelength shifter device of the present invention.

What is claimed is:

1. A light wavelength shifter device comprising:
   an optical waveguide type light wavelength shifter element which comprises a core of a nonlinear optical crystal having a varying rate of refractive index with respect to temperature higher than $1 \times 10^{-4}/°$ C., and a cladding in contact with the core so that a primary incident light on the core can be shifted to a second harmonic wave having a wavelength of half the wavelength of said primary incident light; and
   a thermoelectric element in contact with said optical waveguide type light wavelength shifter element.

2. A light wavelength shifter device as claimed in claim 1, wherein said thermoelectric element is made of a Peltier device whose generation and absorption of heat are regulated by a supplied electric current.

* * * * *